May 3, 1932.  H. LUCAS  1,856,838
TRACTOR WHEEL
Filed June 27, 1930   2 Sheets-Sheet 1

Inventor
Harley Lucas

By Clarence A. O'Brien
Attorney

May 3, 1932.  H. LUCAS  1,856,838
TRACTOR WHEEL
Filed June 27, 1930  2 Sheets-Sheet 2

Inventor
Harley Lucas
By Clarence A O'Brien
Attorney

Patented May 3, 1932

1,856,838

UNITED STATES PATENT OFFICE

HARLEY LUCAS, OF ELMWOOD, ILLINOIS, ASSIGNOR OF ONE-HALF TO CORNELIUS A. VANCE, OF ELMWOOD, ILLINOIS

TRACTOR WHEEL

Application filed June 27, 1930. Serial No. 464,369.

This invention relates broadly to wheels, and the primary object of this invention is to provide an improved wheel for tractors.

The primary object of this invention is to provide a tractor wheel having ground engaging cleats thereon, together with means for adjusting the cleats radially with respect to the wheel whereby to make it possible for the owner of the tractor to have the regular service of a four inch spade cleat and at the same time the convenience of a one-inch cleat, or a two and one half inch cleat, according to the point of adjustment at which the cleats are disposed radially with respect to the wheel.

A still further object of the invention is to provide a tractor wheel having adjustable cleats associated therewith together with means for expeditiously and conveniently adjusting the cleats radially with respect to the wheel.

A still further object of the invention is to provide a wheel of this character which is comparatively simple in construction, wherein the adjustment means for the cleats may be easily operated, and further to provide a wheel of this character which will also permit of facility in the cleaning of the wheel.

Figure 1:
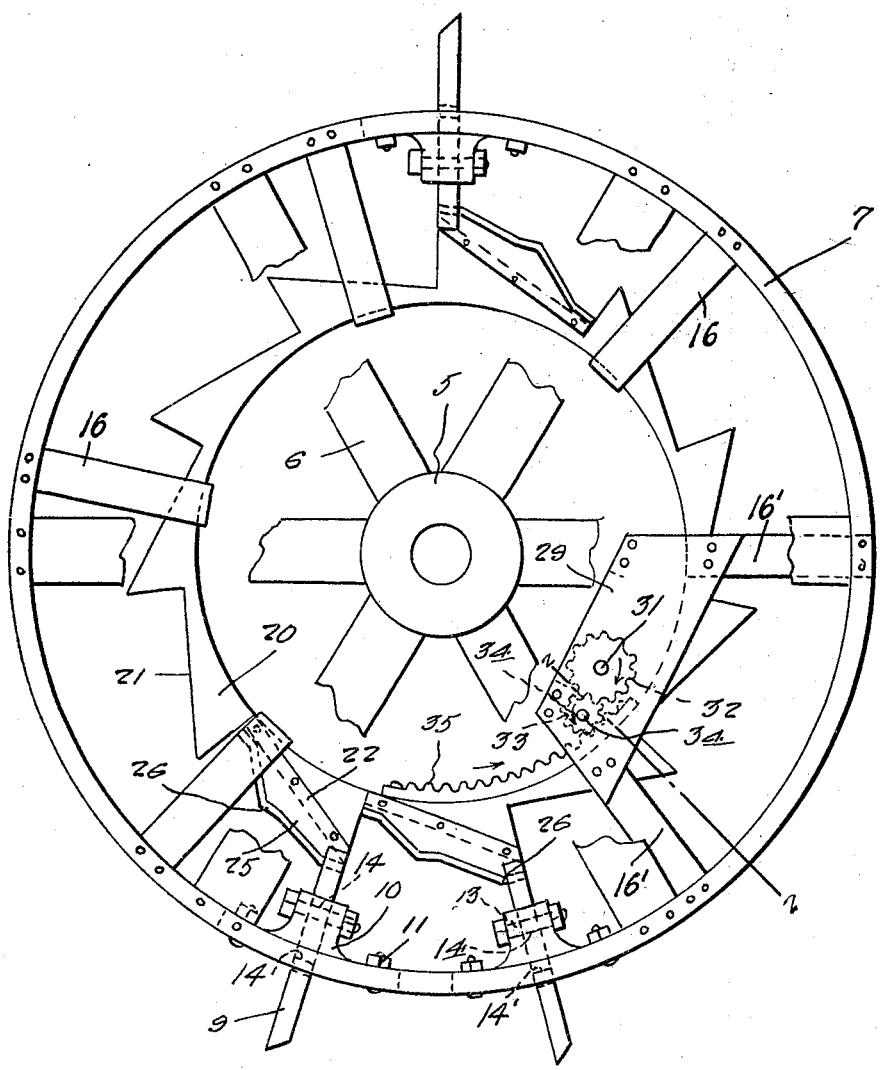
Figure 2:
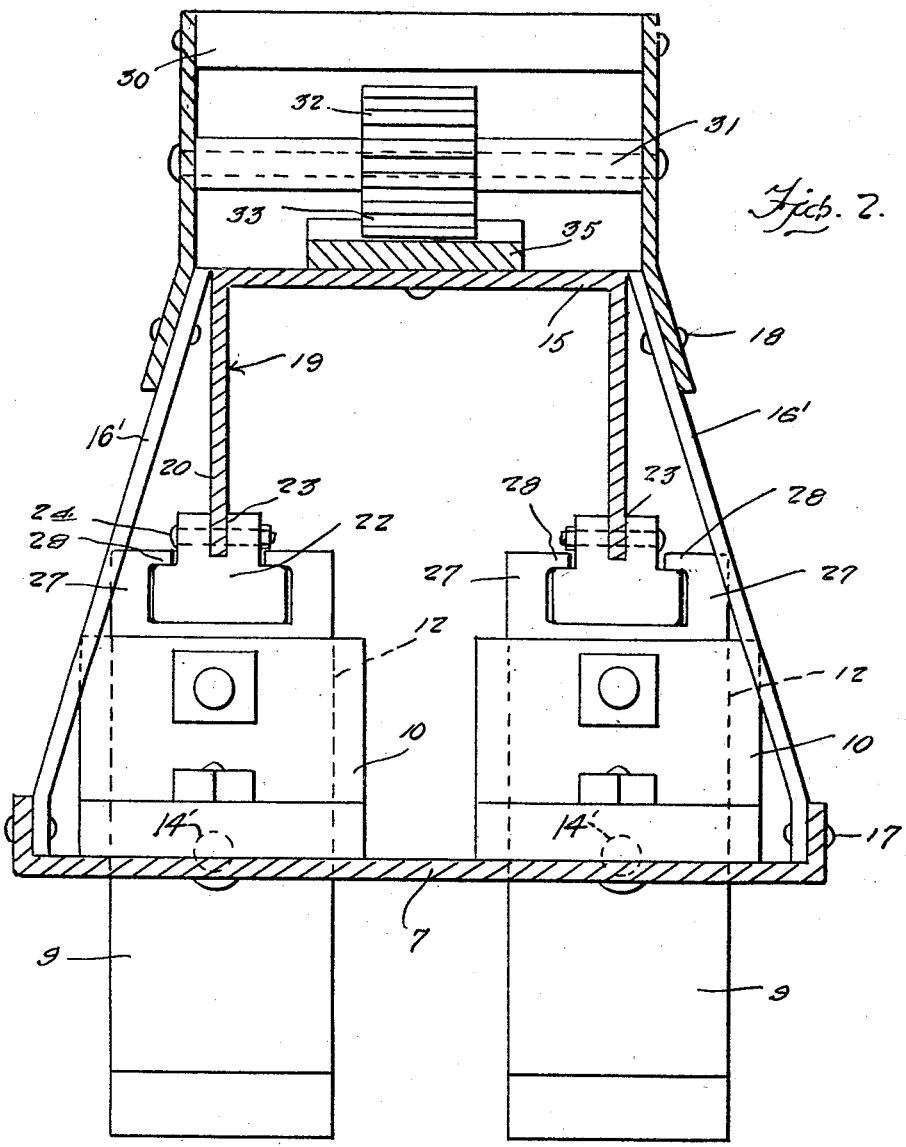
Figure 3:
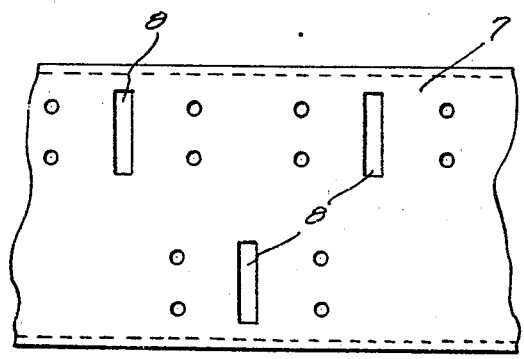

Other objects and advantages of the invention will become apparent during a study of the following description, taken in connection with the accompanying drawings, wherein:

Figure 1 is a side elevational view of a wheel, certain parts being shown broken away for more fully illustrating the invention, Figure 2 is a detail sectional view taken through the wheel on the line 2—2 of Figure 1, Figure 3 is a fragmentary top plan view of a portion of the rim of the wheel.

Referring in detail to the drawings, it will be seen that the improved tractor wheel comprises essentially a hub 5 having spokes 6 radiating therefrom and at their outer ends secured to a rim 7. The rim 7 is preferably channel shaped in cross section.

The rim 7 is provided on its periphery with a plurality of series of circumferentially spaced slots, the slots of one series being arranged in staggered relation with respect to the slots of the other series. Slidably mounted in each of the slots, for radial movement with respect to the wheel is a cleat 9 of substantially elongated rectangular configuration. Secured to the inner face of the rim 7 adjacent each of the slots 8 is a lug 10 suitably bolted to the rim as at 11. Each of the lugs 10 is provided with a non-circular opening 12 extending therethrough and arranged in alinement with a slot 8 for slidably accommodating the inner end of the cleat 9.

On opposite sides of the opening 12 the lug 10 is provided with bolt accommodating openings 13 for receiving therein a suitable adjusting bolt 14. The cleat 9 is also provided with a plurality of longitudinally spaced bolt accommodating holes 14' adapted to selectively register with the bolt holes 13 for accommodating the bolt 14 whereby the cleat 9 may be retained at a predetermined point of adjustment radially with respect to the wheel.

From the foregoing then it will be seen that the cleats of the wheel may be adjusted radially with respect to the wheel so that the ground engaging end of the cleats may extend beyond the wheel rim any predetermined portion of its ength, that is of the length of the cleat.

For example the cleats may be projected beyond the periphery of the wheel for an inch, two and one-half inches, or for any other predetermined portion of the length of the cleats. In this manner, it will be readily appreciated that a wheel equipped with radially adjustable cleats in the manner comprehended by this invention will have the convenience of a one inch cleat, a two and one-half inch cleat, etc.

Further, it will be seen that by drawing the cleats through the slots 8 and openings 12 of the lugs 10 any mud, snow, or the like that has accumulated on the cleats will be readily removed therefrom thus cleaning the cleats. It will also be apparent that the cleats may be drawn inwardly to such an extent that the outer ends of the cleats may be substantially flush with the outer face of the wheel rim 7 so that the periphery of the wheel will be substantially smooth thus permitting of the tractor to be drawn over pavements or concrete surfaces without injury to such surfaces.

The invention also comprehends means for adjusting the cleats simultaneously with means for securing the cleats at predetermined points of adjustment.

Such means comprises an annular member 15 arranged concentrically of the rim 7 and supported from the rim through the medium of radial metallic supporting straps 16. When the cleats have been projected or retracted radially through the instrumentality of the member 15, the cleats are subsequently secured at the desired adjustment through the medium of the bolts 14 passed through the openings 13 in the lugs 10 alining with the holes 14' in the cleats 9 as hereinbefore described.

These straps 16 are bolted at one end as at 17 to the side flanges of the rim, and said members are substantially U-shaped to suspend member 15 from the rim 7.

The member 15 is somewhat channel shaped in cross section, having outwardly extending annular parallel flanges 19. The flanges 19 at their outer edges are cut in somewhat of a staggered manner to provide radial supporting webs 20 having inclined outer edges 21.

For each cleat 9 there is provided what may be termed a shoe 22. The shoe 22 comprises a body portion provided with a longitudinally extending channel or groove 23 that receives therein the outer end portion of a web 20 so that the shoe rests on the inclined edge of the web 20 and assumes a position corresponding to the edge 21. The shoe is secured to the web 20 through the medium of suitable bolts or other fastening elements 24.

Each shoe 22 is provided on opposite sides thereof with longitudinally extending flanges 25 whose other longitudinal edges are cut somewhat in a zig-zag manner to provide shoulders 26.

Each of the cleats 9 at the inner end thereof is bifurcated to provide a pair of spaced parallel legs 27 to straddle a shoe 22. The legs 27 of the respective cleats at their inner free ends are provided with inwardly directed extensions 28 to engage the under faces of the flanges 25 of the shoe. The shoulders 26 of the respective shoes are arranged in pairs, and the extensions or legs 27 engage the shoulders of the respective pairs dependent upon the points of radial adjustment at which the cleats are to be disposed.

The member 15 is of course adapted to be rotated relative to the wheel, and it will be apparent that due to the inclined position of the shoes as the member 15 is rotated and the shoes pass between the legs 27 of the respective cleats, the cleats will be forced either inwardly or outwardly radially with respect to the wheel and according to the direction of rotation of the member 15.

Bolted to a pair of the members 16' as at 18 on opposite sides of the wheel are suitably shaped plates 29. These plates 29 at their inner longitudinal edges are braced with respect to one another through the medium of suitable brace bars 30 extending between the plates at the ends of the plates.

Rotatably supported between the plates 29 is a shaft 31 that has a relatively large ratchet wheel 32 splined thereto in any suitable manner. The ratchet wheel 32 is in mesh with a relatively smaller ratchet wheel 33 mounted on a shaft 34 which extends between the plates. The ratchet wheel 33 is in mesh with an arcuate rack bar 35 suitably secured to the member 15 on the inner face of the member 15.

Any suitable handle means (not shown) may be utilized for rotating the shaft 31 for rotating ratchet wheel 32 for transmitting rotative movement to the member 15 in a desired direction through the medium of the ratchet wheel 33 engaging the teeth of the ratchet bar 35 as is apparent.

Obviously, by rotating the member 15 in this manner and retaining the tractor wheel stationary so that the member 15 moves relative thereto, the shoes carried by the member will pass between the legs of the respective cleats thus moving the cleats radially through the lugs 10 and slots 8 to position the cleats at any predetermined point of radial adjustment with respect to the wheels.

In this manner then it will be seen that the cleats may be projected radially beyond the rim of the wheel for any predetermined portion of their length. From the foregoing then it will be seen that through the medium of this device it is possible for a tractor owner to have a smooth wheel tractor for road work for use on hard ground, also a tractor with a set of one inch cleats for use on frozen ground, hard ground or any place which does not require a great deal of traction, a two and one-half inch cleat for soft ground, and a four inch cleat for any regular farming operation requiring a great deal of traction.

It is also apparent that a device of this character will meet the requirements for all general purposes without weakening the wheel in any manner or adding anything to the construction of the wheel that will hinder the usual operation of the wheel. Furthermore it will be appreciated that the cleats mounted for radial adjustment on the wheel in a manner comprehended by the present invention will also permit of easy cleaning of the wheel by simply moving the cleats radially with respect to the wheel inwardly and outwardly with respect to the wheel for removing the mud clots on the cleats.

Even though I have herein shown and described the preferred embodiment of my invention, it is to be understood that the same is susceptible to changes fully comprehended by the spirit of the invention as herein described, and the scope of the appended claim.

Having thus described my invention, what I claim as new is:

A traction wheel comprising in combination a rim provided with a plurality of openings, traction cleats movable radially with respect to the axis of the wheel through said openings, and an annular actuator operable circumferentially within the confines of said rim, cam shoes, there being one cam shoe for each of said cleats, means for detachably connecting said cam shoes with said actuator, said shoes and said cleats having co-operating means for effecting a positive cam connection therebetween whereby to adjust said cleats radially with respect to said rim upon rotation of said actuator, each of said shoes intermediate its ends provided with shoulders engageable with a cleat for limiting rotation of said actuator member in one direction when the cleats are fixed at the desired adjustment, and means operable independently of said actuator for fixing the cleats at the desired adjustment relative to the rim.

In testimony whereof I affix my signature.

HARLEY LUCAS.